United States Patent [19]

Godrick

[11] 3,987,784
[45] Oct. 26, 1976

[54] SOLAR ENERGY ABSORBER PANEL
[75] Inventor: Joseph A. Godrick, Wellesley, Mass.
[73] Assignee: Kennecott Copper Corporation, New York, N.Y.
[22] Filed: Aug. 21, 1975
[21] Appl. No.: 606,512

[52] U.S. Cl. .............................. 126/271; 126/270
[51] Int. Cl.² ........................................ F24J 3/02
[58] Field of Search ............ 126/271, 270; 237/1 A

[56] References Cited
UNITED STATES PATENTS

| | | | |
|---|---|---|---|
| 2,208,789 | 7/1940 | Cally | 126/271 |
| 2,358,476 | 9/1944 | Routh et al. | 126/271 |
| 2,448,648 | 9/1948 | Zideck | 126/271 |
| 3,194,228 | 7/1965 | Bargues | 126/271 |
| 3,399,664 | 9/1968 | Suhay | 126/271 |
| 3,916,871 | 11/1975 | Estes et al. | 126/271 |

Primary Examiner—Kenneth W. Sprague
Attorney, Agent, or Firm—John L. Sniado; Lowell H. McCarter; Anthony M. Lorusso

[57] ABSTRACT

Disclosed is a solar energy absorber panel comprising a heat absorbing and conducting sheet and an array of fluid conduits in thermal contact with the sheet. For a given efficiency, the weight of the panel is minimized by providing a sheet thickness of between about 0.001 inch and about 0.006 inch and a conduit density of between about 3 and about 7 conduits per foot. To precisely accomplish the weight minimization, for given operating parameters (i.e., effective insolation level per unit area, $S_{eff}$, and sheet internal temperature difference, $T_L-T_0$), the sheet thickness, $t_s$, is chosen to minimize the panel weight per unit area, WA, where $$WA = p_s t_s + \frac{w_t}{\left[\frac{8(T_L-T_0)k_s t_s}{S_{eff}}\right]^{1/2}} + W$$

where $p_s$ is the sheet material's density, $w_t$ is the weight per unit length of conduit, $k_s$ is the sheet's thermal conductivity, and W is the conduit width in contact with the sheet. For the value of $t_s$ thus determined, the conduit spacing, L, is determined as L = $(8(T_L - T_0)k_s t_s/S_{eff})^{1/2}$.

8 Claims, 7 Drawing Figures

SOLAR ENERGY ABSORBER PANEL

BACKGROUND OF THE INVENTION

This invention relates to improvements in solar absorber units in which a panel, which is exposed to solar radiation, heats an energy transfer fluid.

Solar absorber units of this general type have been known for many years and there is at least one such unit that is commercially available (manufactured by Beasley Industries Pty, Ltd., Bolton Avenue, Devon Park, South Australia 5008). In the design of absorber panels for such units, however, one is confronted by the generally competing goals of high efficiency on the one hand, and low cost and weight on the other. Thus, for example, the panel's efficiency normally increases with an increase in the number of fluid conduits provided on the panel. The increase in conduits, however, adds to both the weight and cost of the panel; especially when materials must be used that are both excellent thermal conductors and corrosion resistant. Previous attempts to resolve this dichotomy, to the extent it was perceived, have evidently been haphazard.

SUMMARY OF THE INVENTION

In view of the foregoing, it is a principal object of the present invention to provide a solar energy absorber panel that, for a given efficiency, has a minimum weight.

The invention features improvements in a solar energy absorber panel that comprises a sheet of material having a surface for exposure to solar radiation and an array of conduits in thermal contact with the sheet extending thereacross. The sheet has a thickness of no greater than about 0.006 inch and there are between about 3 to 7 conduits per foot across the sheet. More particularly, for a sheet of thickness $t_s$, thermal conductivity $k_s$, and density $p_s$ and for a conduit array having an average conduit spacing of L, an average width, W, of conduit-sheet contact, and a weight per unit length conduit of $w_t$, a panel constructed according to the present invention has a sheet thickness, $t_s$, such as to minimize WA as comprised in the following equation:

$$WA = p_s t_s + \frac{w_t}{\left[\frac{8(T_L - T_0)k_s t_s}{S_{eff}}\right]^{1/2} + W}$$

where $T_L$ is the sheet temperature midway between two adjacent conduits, $T_0$ is the sheet temperature at a location aligned with a conduit, and $S_{eff}$ is the effective insolation level of the solar radiation upon the sheet (i.e., the net thermal energy gain per unit time and sheet area). The optimum conduit spacing, L, is then determined, using the value of $t_s$ thus derived, from the expression $L = (8(T_L - T_0)k_s t_s/S_{eff})^{1/2}$. In particular preferred embodiments, the sheet is copper; the conduits are at least partly copper; each conduit has a width (across the sheet) greater than its thickness (perpendicular to the sheet); and each conduit is soldered to a surface of the sheet.

DETAILED DESCRIPTION OF PARTICULAR PREFERRED EMBODIMENTS

Figure 1:
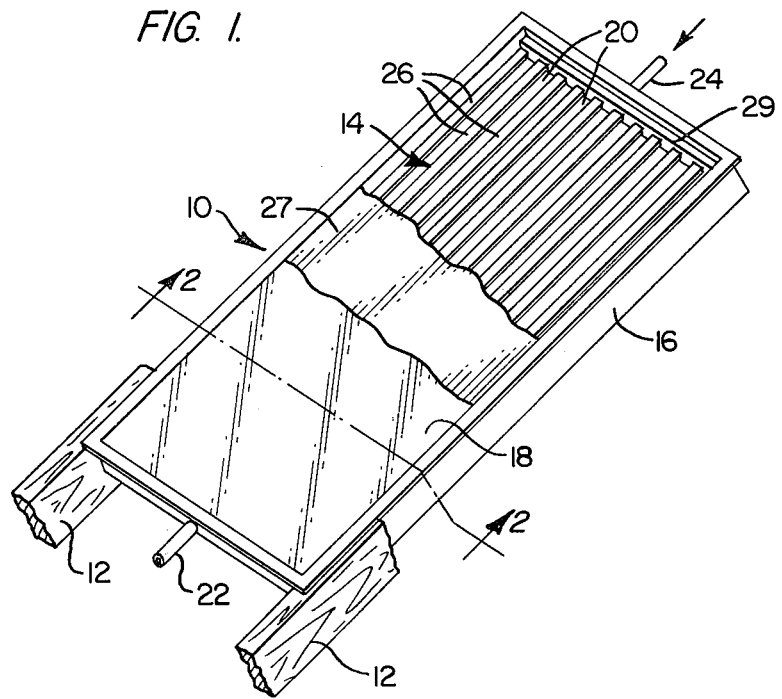
FIG. 1 is a partially broken away perspective view of a solar absorber unit incorporating features of the present invention.

FIG. 1 illustrates a solar absorber unit 10 sized to be supported between rafters 12 of a roof. The unit comprises a solar absorber panel 14 supported in a frame 16 intermediate an overlying glass plate 18 and underlying insulation 20, both of which are employed, as is conventional, to reduce heat loss from panel 14 back to the ambient. Plumbing fittings 22, 24 deliver an energy transfer fluid (e.g., water) to, and remove it from, conduits 26 provided on the undersurface of a sheet 27, which, together with conduits 26, defines panel 14. The conduits 26 are arranged in a parallel array extending the length of the panel. Manifolds or headers 29 connect each conduit to the fittings, 22, 24.

Figure 2:
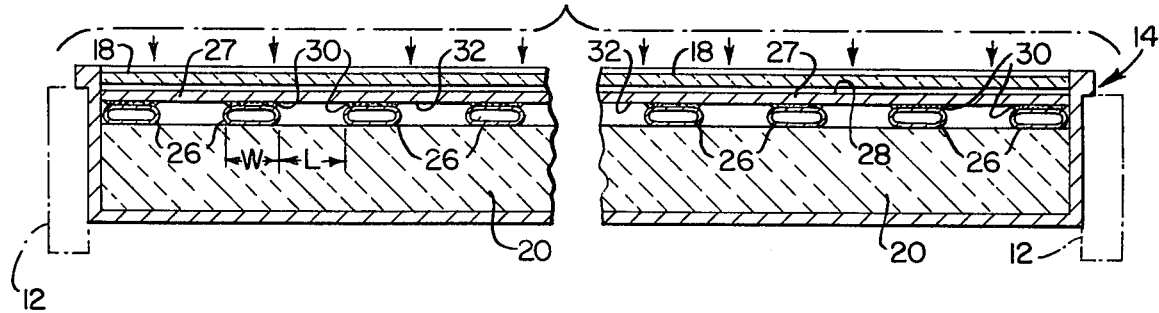
FIG. 2 is an enlarged view taken at 2—2 of FIG. 1, in which certain dimensions have been exaggerated for clarity.

Referring to FIG. 2, radiant solar energy (indicated by arrows) incident upon the exposed upper surface 28 (which is typically painted black) of sheet 27, is absorbed, causing the temperature of the sheet to rise. Heat is transferred to the fluid, flowing in the conduits 26, by passing through the sheet, through a bond 30 at the conduit-sheet interface (or any other thermal contact between the conduit and sheet), through the tube wall, and ultimately into the fluid.

In the preferred embodiment illustrated in FIG. 2, sheet 27 is a thin (e.g., 0.0027 inch) copper sheet and the conduits are thin walled (e.g., 0.008 inch) rectangular copper radiator tubes having a width of about ½ inch (and since the full width is in contact with sheet 27, W = ½ inch) and spacing, L, of about 1.5 inches. Each tube has a flat side bonded with minimum thermal resistance (e.g., soldered) to the undersurface 32 of sheet 27. While both the sheet and the conduits can be formed from other materials, copper base materials are preferred because of their compatibility with existing home heating systems, their ease of formability and their high corrosion resistance (which together allow the manufacture and use of thin walled tubing), and their high thermal conductivity.

Because heat is withdrawn from sheet 27 through bonds 30, a temperature differential, $T_L - T_0$, exists in the sheet itself between the midpoint between tubes $(T_L)$ and a sheet location aligned with a tube $(T_0)$. A temperature differential, $T_0 - T_f$, also exists between the sheet above a tube location and the working fluid in the tube. To a first approximation, for a given ambient temperature, solar absorber unit energy losses increase in proportion to the average absorber panel temperature. Thus, in order to enhance collector performance, the temperature differences described above, which necessarily cause the average panel temperature to be above the fluid working temperature, should be kept to small levels, (e.g., $T_L - T_0 = 10°$ F).

For any given application of a solar absorber unit, an allowable temperature difference, $T_L - T_0$, and an effective insolation level, $S_{eff}$, which accounts for probable energy losses from the unit, can be specified. $S_{eff}$ is simply the net thermal energy gain of the panel 14 per unit time and panel area (i.e., BTU/hr-ft²). Typical values of $S_{eff}$ for insulated glass enclosed panels (see FIG. 1) used in temperate zones range up to 250 BTU/hr-ft².

According to the present invention, it has been discovered that the tube spacing L, can be expressed in terms of sheet 27 thickness, $t_s$, sheet 27 conductivity, $k_s$, allowable sheet temperature difference, $T_L - T_0$, and effective insolation level, $S_{eff}$, as $$L = (8[T_L - T_0]k_s t_s/S_{eff})^{1/2} \qquad 1.$$

The weight of an absorber panel per unit area, WA, can be expressed as $$WA = p_s t_s + w_t N \qquad 2.$$

where $p_s$ is the density of sheet 27, $t_s$ is its thickness, $w_t$ is the weight per unit length of tubing and N, the tube factor, is the number of tubes per unit length across the absorber panel. In terms of spacing, L, and thermal bond width, W, $$N = 1/(L + W) \qquad 3.$$

Eqns. (1), (2), and (3) can be combined to obtain the weight per unit area of an absorber panel in terms of the fixed parameters and sheet thickness as $$WA = p_s t_s + \frac{w_t}{\left[\frac{8(T_L-T_0)k_s t_s}{S_{eff}}\right]^{1/2} + W} \qquad 4.$$

Thus, for a particular sheet material, tubing material, and tube size, an optimum sheet thickness, $t_o$, is derivable from Eqn. (4). An optimum tube spacing, $L_o$, can then be determined by using $t_o$ in equation (1), to provide an absorber panel of minimum weight under performance constraints specified by $S_{eff}$ and $T_L - T_0$.

Figure 3:
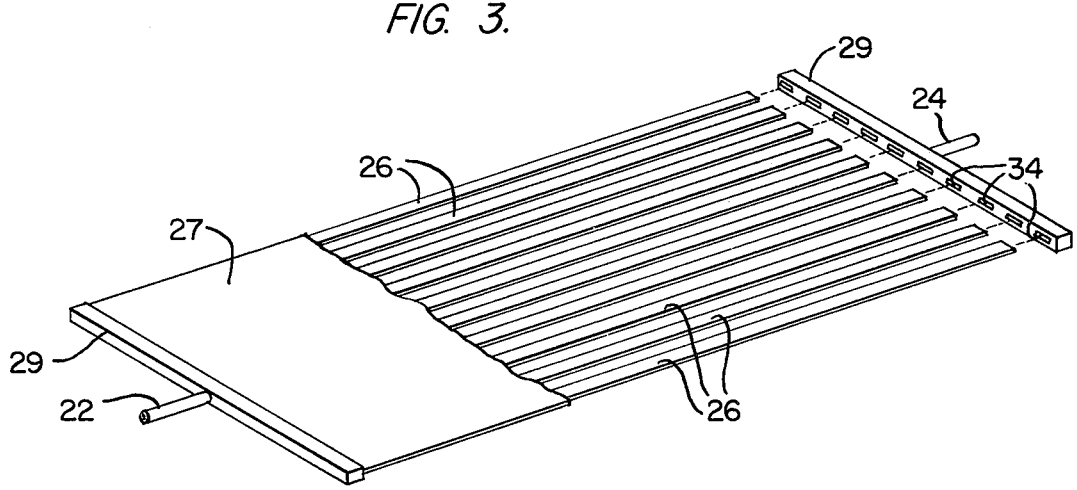
FIG. 3 is perspective view of a tube assembly of a panel of the present invention.
Figure 4:
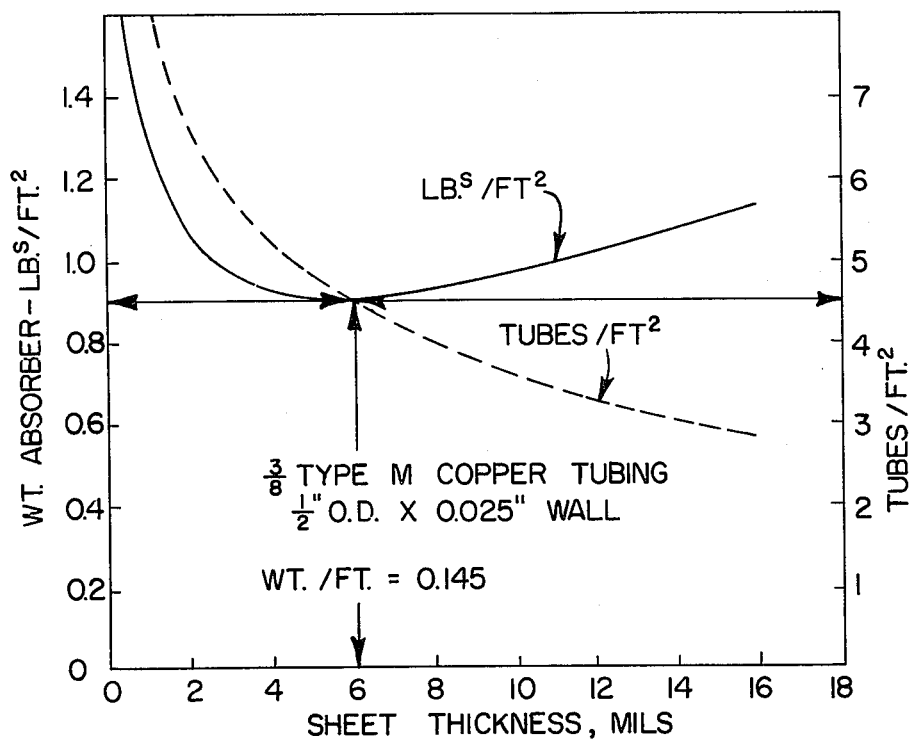
FIGS. 4–7 are graphs that demonstrate the application of the invention to particular embodiments of solar absorber panels.
Figure 5:
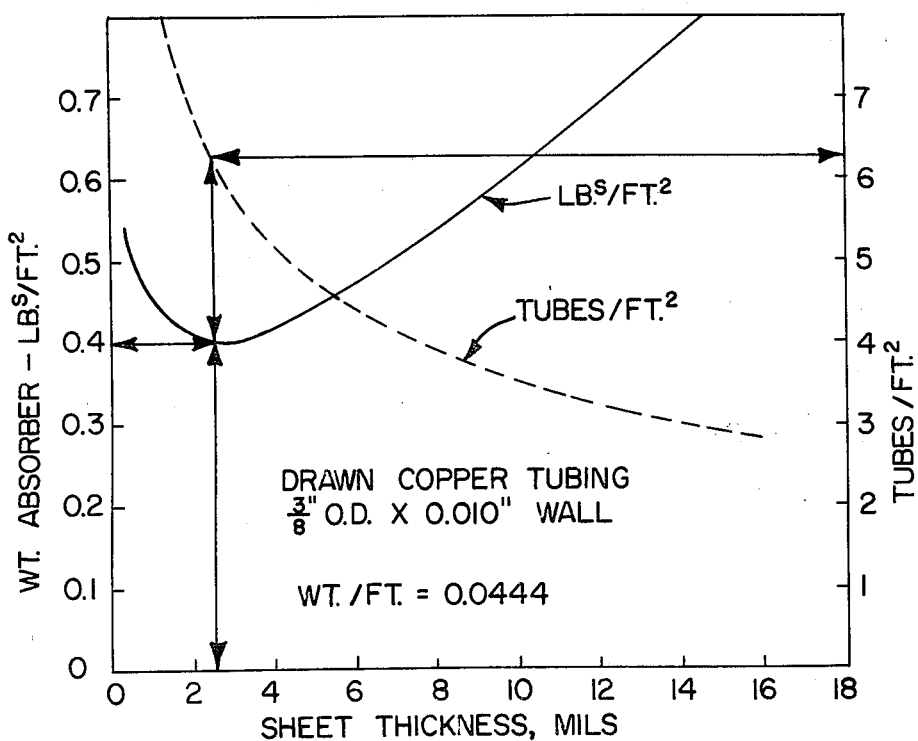
Figure 6:
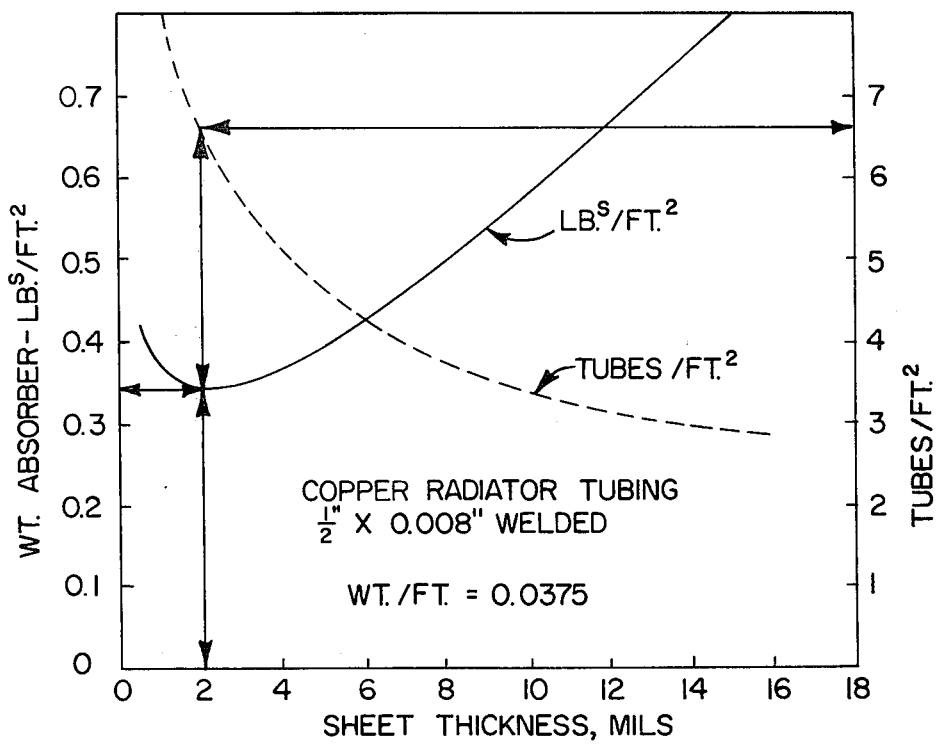
Figure 7:
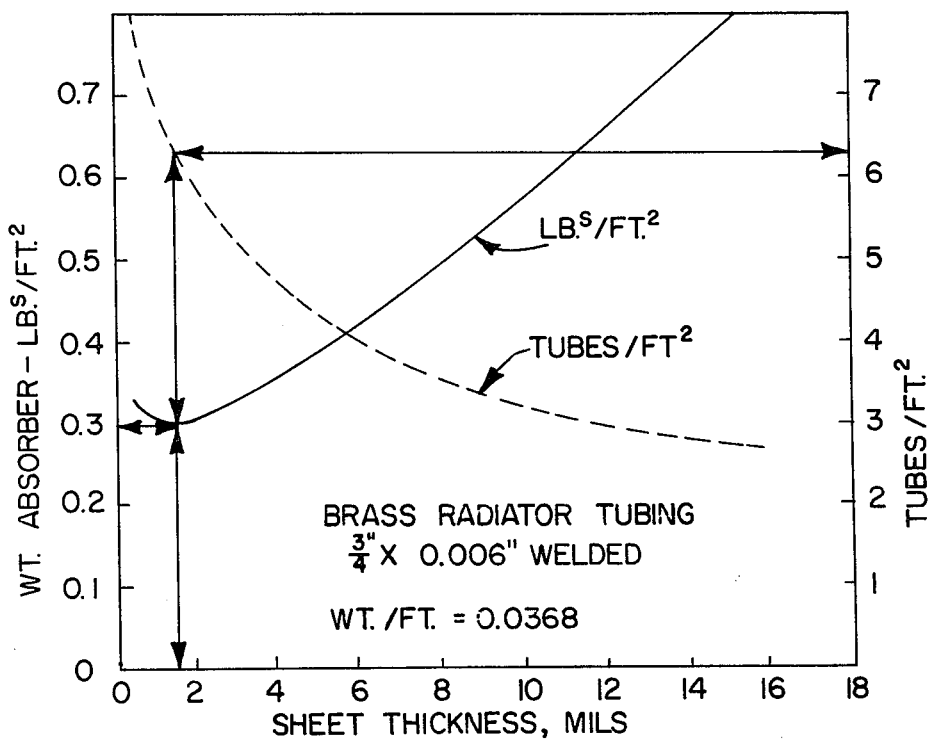

Panels 14 may be constructed in the following manner. Two headers 29 (see FIG. 3) are laid out on a table. As is shown in FIG. 3 the headers are square in cross section and are provided with pre-punched holes 34 for receiving conduits 26. Conduits 26 are then inserted into the pre-punched holes and are soldered in place. A strip of soldering tape is then applied along the length a flat surface of each rectangular conduit 26. A sheet 27 is then placed over the tubes and the soldering tape. The assembly is then heated to a temperature at which the solder flows. It has been found convenient to heat the assembly to the appropriate temperature by placing heating blankets (not shown) above and beneath the assembly. When cooled, the upper surface 28 of sheet 27 is then sprayed with black paint or otherwise coated to more efficiently absorb radiation. The assembly is then placed in frame 16 which has been backed with insulation 20 (see FIGS. 1 and 2).

EXAMPLES

Using the above methodology, absorber panels were investigated having copper sheets 27 and having conduits consisting of (1) standard copper plumbing tube (⅜ inch, Type M), (2) thin wall copper tubing (⅜ OD × 0.010 inch wall), (3) copper radiator tubing of ½ (width) × 0.008 inch (wall) welded tubing, and (4) brass radiator tubing of ¾ (width) × 0.006 inch (wall) welded tubing. Performance factors of $T_L - T_0 = 10°$ F and $S_{eff} = 250$ BTU/hr-ft² were chosen to represent potential, but relatively stringent, operating conditions. Results of the optimization procedure for each type of conduit are shown in FIGS. 4–7 respectively. While all optimized panels should save weight over prior art panels, these curves show that, by using radiator tubing in an optimized design, a weight savings of approximately 60% can be obtained over a design using standard copper plumbing tube similarly optimized. As indicated in two curves for radiator tubing (FIGS. 6 and 7), optimum sheet thickness ranges from 1 to 3 mils with corresponding tube factors of 7–5 tubes/ft when tube widths of ½ inch and ¾ inch are used. Furthermore, a design using thin wall copper tubing can also provide a weight saving over standard plumbing tubing using sheet thicknesses of 1.5 to 4.0 mils and corresponding tube factors of 8.0 to 5.5 tubes/ft.

While particular preferred embodiments have been described in detail herein, other embodiments are within the scope of the invention and the following claims.

I claim:

1. In a solar energy absorber panel comprising
   a sheet of material having a surface for exposure to solar radiation, a thickness $t_s$, a thermal conductivity of $k_s$, and a density of $p_s$, and
   a plurality of fluid conduits in thermal contact with said sheet and extending thereacross for conducting an energy transfer fluid across said sheet, said conduits having an average separation of L, and an average conduit width in contact with said sheet of W, and a weight per unit length of conduit of $w_t$;
   the improvement wherein $t_s$ has a value that substantially minimizes the expression $$p_s t_s + \frac{w_t}{\left[\frac{8(T_L-T_0)k_s t_s}{S_{eff}}\right]^{1/2} + W},$$

yielding an optimum sheet thickness $t_o$, where $T_L$ = the sheet temperature midway between the two adjacent conduits, $T_0$ = sheet temperature at a sheet portion aligned with a conduit, and $S_{eff}$ = the effective insolation level; and
   wherein L is $L = (8[T_L - T_0]k_s t_o/S_{eff})^{1/2}$;
   whereby for a given $S_{eff}$ and $(T_L - T_0)$, the weight per unit area of the solar energy absorber panel will be substantially minimized.

2. The improved solar energy absorber panel of claim 1, wherein said sheet comprises copper.

3. The improved solar energy absorber panel of claim 2, wherein each said conduit comprises copper and said fluid is water.

4. The improved solar energy absorber panel of claim 1, wherein each said conduit has a width across said sheet that is greater than its thickness perpendicular to said sheet.

5. The improved solar energy absorber panel of claim 4, wherein each said conduit has a width at least about ½ inch.

6. The improved solar energy absorber panel of claim 5, wherein each said conduit has a wall thickness of less than about 0.01 inch.

7. The improved solar energy absorber panel of claim 1, wherein each said conduit is soldered to a surface of said sheet.

8. The improved solar energy absorber panel of claim 7, wherein each said conduit is soldered to the surface of said sheet opposite said surface exposed to solar radiation.

* * * * *